United States Patent [19]

Kinoshita et al.

[11] 4,360,833
[45] Nov. 23, 1982

[54] LIGHT SENSITIVE SEMI-CONDUCTOR ELEMENT AND ARRANGEMENT

[75] Inventors: Takao Kinoshita; Nobuhiko Shinoda; Shinji Sakai, all of Tokyo, Japan

[73] Assignee: Canon Kabushiki Kaisha, Tokyo, Japan

[21] Appl. No.: 206,487

[22] Filed: Nov. 13, 1980

[30] Foreign Application Priority Data

Nov. 15, 1979 [JP] Japan .................................. 54-148616

[51] Int. Cl.³ .............................................. H04N 3/14
[52] U.S. Cl. .................................................... 358/213
[58] Field of Search .......................................... 358/213

[56] References Cited

U.S. PATENT DOCUMENTS

| 4,064,533 | 12/1977 | Lampe et al. | 358/213 |
| 4,117,514 | 9/1978 | Terui et al. | 358/213 |
| 4,263,620 | 4/1981 | Felix | 358/213 |

*Primary Examiner*—Richard Murray
*Attorney, Agent, or Firm*—Toren, McGeady & Stanger

[57] ABSTRACT

In the disclosed element, a number of line shaped sensors each includes a plurality of P-N junctions each of which accumulates a charge corresponding to the amount of light incident thereon. A number of registers, one for each sensor, each defines addresses coupled to respective P-N junctions of the corresponding sensor to have the charge accumulated on each P-N junction transferred to the respective address in each register so that time sequential signals can be obtained from each register. A collection register has an address coupled to each of the other registers to store the time sequential output signals so that the stored signals can be read out sequentially. A gate arrangement connecting the output of the first registers to each address controls the time interval during which the time sequential signals of the first registers are transferred to the accumulating register.

13 Claims, 6 Drawing Figures

LIGHT SENSITIVE SEMI-CONDUCTOR ELEMENT AND ARRANGEMENT

BACKGROUND OF THE INVENTION

This invention relates to solid state image sensing semi-conductor elements, particularly those which store and transfer signals corresponding to image signals.

Conventional image sensors such as CCD sensors used in television cameras have the disadvantage that their charge integration periods are limited by the time necessary to scan one field of a picture frame. This prevents following up changes in the object brightness. Solid state semi-conductor image sensors present problems of dynamic range for which no fundamental solution has yet been found.

SUMMARY OF THE INVENTION

An object of the present invention is to provide an image sensor responsive to a wide range of incident light signals.

Another object of the invention is to provide an image sensor capable of changing the level of the output signal within a prescribed integration period.

Still another object of the invention is to provide an image sensor capable of improving the contrast of the signal output within a prescribed range of integration periods.

According to an embodiment of the present invention, a plurality of line sensors are provided with the same number of first register means capable of self-scanning each of the line sensors. Since the time-sequential signal outputs of this first register means are fed to and accumulated in the corresponding addresses of second register means, the amount of signals stored in each address is substantially increased.

It should be pointed out that the above-described plurality of line sensors when arranged in parallel to permit the output of each sensor after having once been stored in the second register means to be read out in sequence can be used as a whole in the form of a single line sensor.

It should be further pointed out that the use of the line sensors in such form gives many advantages, one of which is that since the output level of the line sensor can be substantially increased while the integration period remains unchanged, even when the object brightness is very low, the sensor is made sensible to a brightness change.

Another advantage is that the device, according to the invention, can sense dim objects with little contrast.

Another advantage is that, conversely, the output produced by very bright objects can be reduced to proper levels.

Thus, the image sensor of the invention, because it is able to provide a optimum output regardless of a wide range of variations of object brightness, achieves a great increase in dynamic range.

DESCRIPTION OF THE PREFERRED EMBODIMENTS

The present invention is to optimize the video signal produced from the solid state semi-conductor element, depending upon its purpose. To achieve this, an external control signal, for example, one representative of the object brightness or contrast is used in making up a pulse signal of prescribed waveform, and it is by this pulse signal that the size of a contribution domain of the solid state semi-conductor element to each picture element is caused to change arbitrarily.

The present invention will next be described in connection with a solid state semi-conductor element constructed to be a line sensor having a photo-diodized photoelectric conversion and accumulation portion and an N-channel CCD-ized charge transfer portion which is the most common as the self-scanning type image sensor, but it is to be understood that the present invention is not confined to the line sensor and is applicable when to construct as an area sensor.

Figure 1:
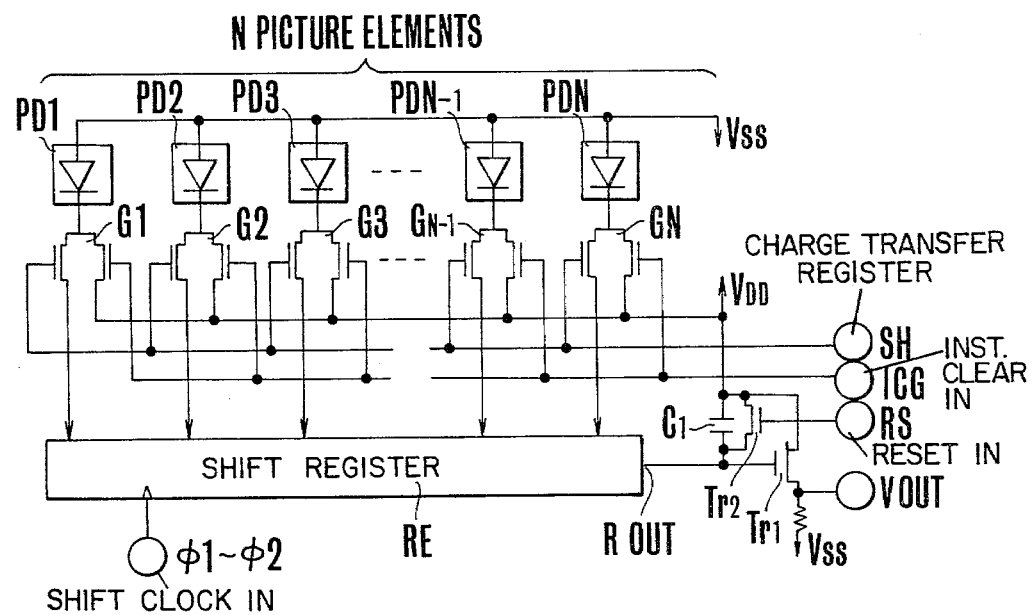
FIG. 1 is an electrical circuit diagram of a line sensor arrangement in the conventional solid state image pick-up element.

In the following, the present invention will be described in greater detail by reference to the drawings. FIG. 1 shows the construction of a generally accepted image sensor in the form of a solid state semi-conductor element. In the figure, PD1 to PDN are a photoelectric conversion and accumulation portion comprising PN junctions forming photodiodes electrically independent of one another. It is noted that since the number of diodes in this instance is N, it is possible to form N picture elements. The anodes of the individual diodes PD1 to PDN are connected to a common negative terminal of a battery. G1 to GN each are an N-channel MOS transistor pairs, forming gates. The sources of each transistor pairs G1 to GN are both connected to the respective photo-diode PD1-PDN at the cathode thereof. The drain of one of the transistors in each pair G1 to GN is connected to the input of the corresponding address of a two-phase CCD-first analogue shift register RE. The gate of each of the first transistors is connected to an input terminal SH. The drain of the other transistor in each transistor pair is connected to a positive terminal VDD of the battery. The gate of each second transistor is connected to an input terminal ICG.

The signals applied from the photo-diodes to the respective addresses in the analogue shift register RE are shifted in sequence by clock pulses $\phi_1$ and $\phi_2$, appearing at an output terminal Rout as a time-sequential signal. The output terminal Rout is connected through a charge-voltage conversion condenser or capacitor C1 to the positive terminal VDD of the battery and also to the gate of an FET Tr1. Connected to the both terminals of the condenser C1 are the source and drain of an FET Tr2, and the gate of the FET Tr2 is connected to a terminal RS.

The drain of the FET Tr1 is connected to the positive terminal of the battery, and its source is connected through a resistor to the negative terminal of the battery.

The source is also connected to a terminal Vout.

The input SH is a charge transfer signal input terminal; ICG is an instantaneous clear signal input terminal; RS is a reset signal input terminal; $\phi 1$, $\phi 2$ are shift signal inputs of the shift register; and Vout is a video signal output terminal.

Figure 2:
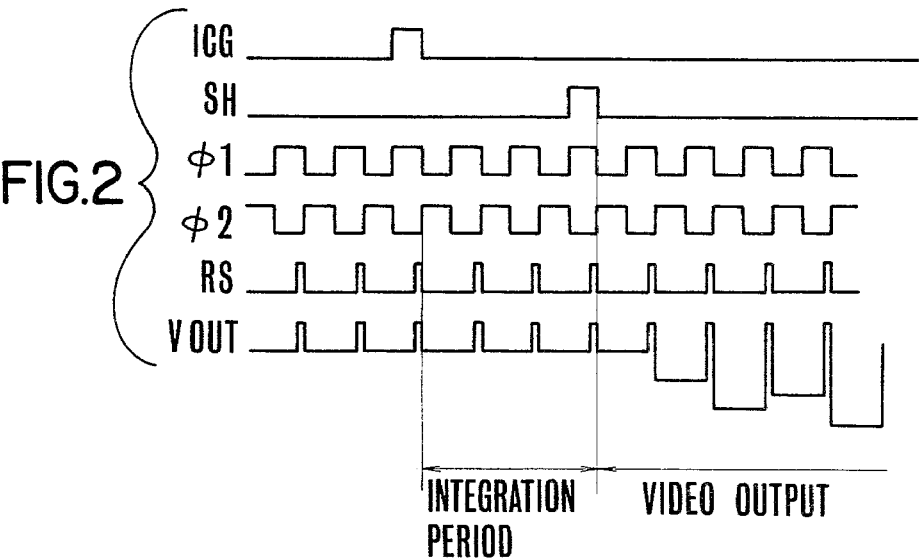
FIG. 2 is a pulse timing chart showing the waveforms of signals in the various portions of the circuit of FIG. 1.

FIG. 2 is a timing chart showing the waveforms of the signals occurring in the various portions of the circuit of FIG. 1. When the instantaneous clear signal is applied to the terminal ICG of FIG. 1, the charges photoelectrically generated and accumulated in the individual photo-diodes PD1 to PDN flow to the positive terminal VDD, thus being cleared up. Then, when a charge transfer signal is applied to the terminal SH, the charges in the photo-diodes are transferred to the two-phase CCD analogue shift register RE. As shown in FIG. 2, the time interval from the falling edge of the pulse ICG to the falling edge of the pulse SH defines the charge integration period of the photoelectric conversion and accumulation portion. The signal charges transferred by the shift pulses $\phi 1$, $\phi 2$ to the shift register RE charge the charge-voltage conversion condenser C1, and this voltage signal appears at the terminal Vout as a video signal. It is noted that the condenser C1 is fed with a reset pulse for each picture element output as shown in FIG. 2, so that a video signal as shown on line Vout in FIG. 2 is produced at the output terminal. In the self-scanning type image sensor using the solid state image pick-up element of FIG. 1, the magnitude of the signal obtained from the photo-diodes PD1 to PDN cannot be changed because it is determined by the shape and characteristics of the element when designed.

Figure 3:
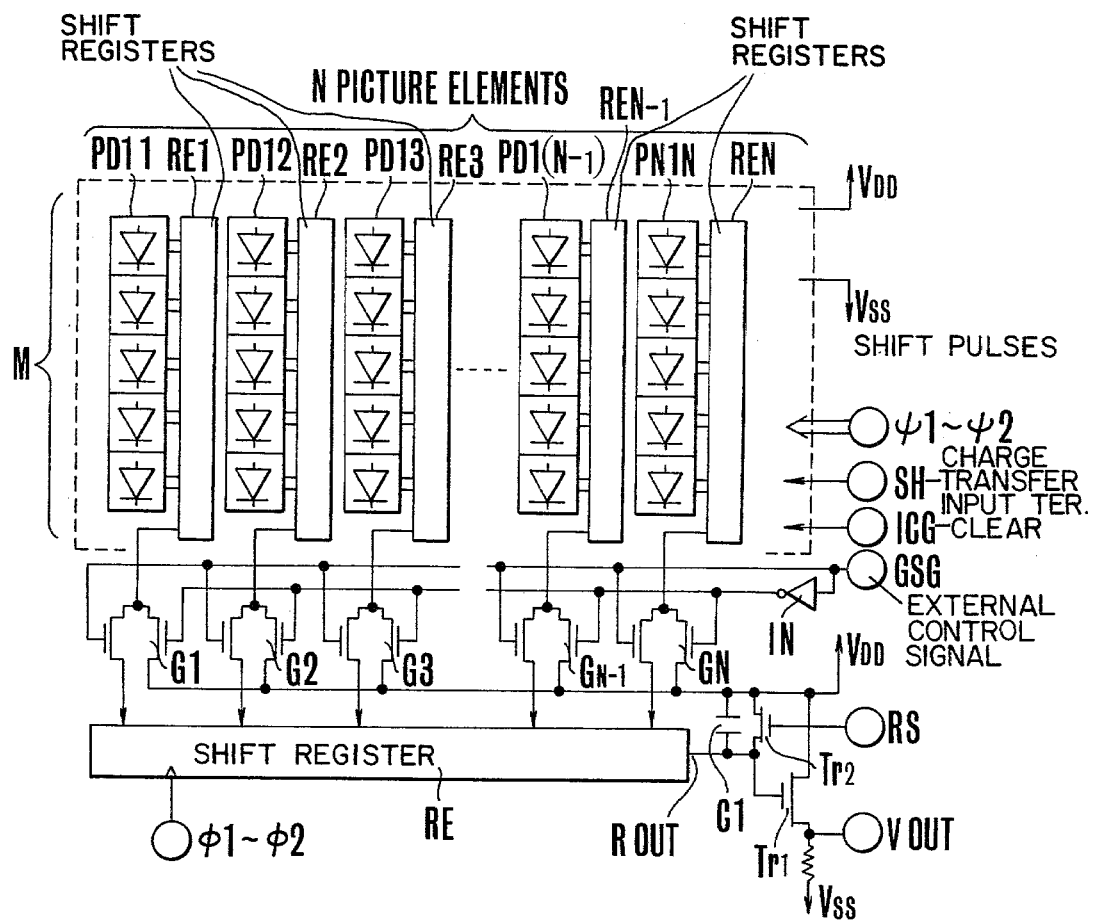
FIG. 3 is an electrical circuit diagram of one embodiment of a self-scanning type image sensor using solid state semi-conductor elements according to the present invention.

FIG. 3 is an electrical circuit diagram of one embodiment of a self-scanning type image sensor using a solid state semi-conductor element according to the present invention. The parts in FIG. 3 corresponding to those in FIG. 1 are denoted by the same reference characters. Though the solid state semi-conductor element illustrated in FIG. 3 would appear to resemble an interline type area sensor of NxM picture elements (in this instance, M=5) in construction, the present invention is characterized in that this is used as a line sensor and that the size of that portion of the domain which contributes to each picture element output is made variable by an external control signal GSG.

The present invention contemplates, in stead of the former photoelectric conversion and accumulation portion, the use of a plurality of line sensor rows PD11 to PD1N in combination with CCD analogue shift registers RE1 to REN-1 as the first register means paired up therewith. Each of the line sensor rows PD11 to PD1N is formed with M PN-junctions and the charge accumulated on each junction is transferred to and stored in the corresponding one of the registers RE1 to REN in response to the input at the charge transfer signal input terminal SH. The charge signals stored in the registers RE1 to REN are applied to the sources of similar MOS transistor pairs G1 to GN to those of FIG. 1 in response to the shift clock pulses $\Psi 1$, $\Psi 2$.

The combinations of the line sensor rows PD11 to PD1N with the registers RE1 to REN can each be formed to a self-scanning type photoelectric conversion element, and a similar drive method to that described in connection with FIG. 1 may be used in producing time-sequential signals from the individual registers RE1 to REN.

The MOS transistor pairs G1 to GN in the present invention form gate circuits, the gate of one of the transistors in each pair G1 to GN being connected to the contribution area control signal input GSG, and its drain terminal being connected to the corresponding address in second register means in the form of a CCD or other suitable analogue shift register RE.

The gate of the other transistor in each pair G1 to GN is arranged to be fed with a signal from the control signal input terminal GSG through an inverter IN, and its drain is connected to the positive terminal VDD of the battery.

The output Rout of the second register RE is connected similar to that in FIG. 1.

Figure 4:
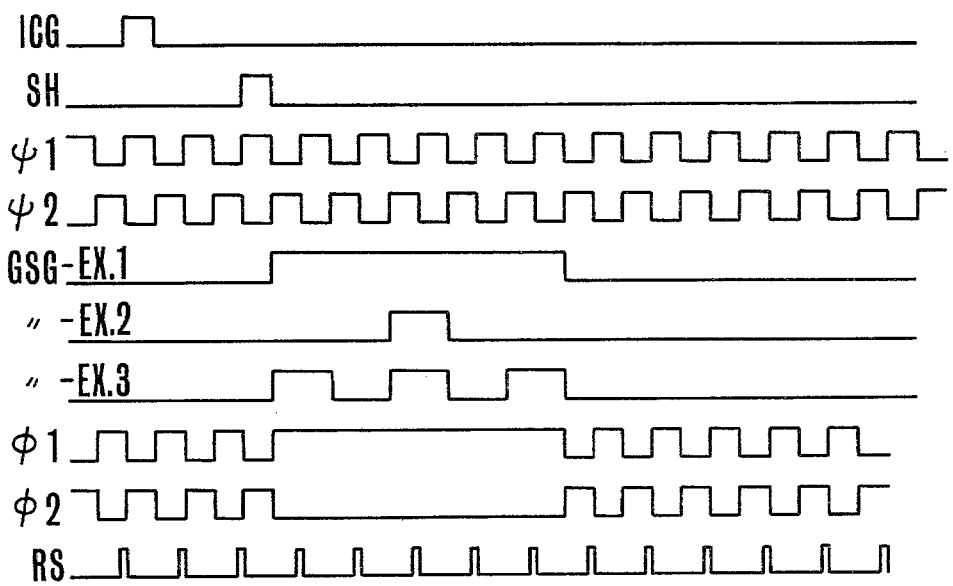
FIG. 4 is a pulse timing chart showing a manner in which the circuit of FIG. 3 operates.

FIG. 4 is a timing chart showing the waveforms in the various portion of the circuit of FIG. 3.

When a momentary clear signal enters at the ICG terminal, the charges stored in the first registers RE1 to REN are cleared up. Then, until the advent of a transfer signal SH, the line sensor rows PD11 to PD1N each accumulate a charge of a magnitude proportional to the incident light intensity. Responsive to this transfer signal SH, the individual charges are transferred to the respective addresses in the first registers RE1 to REN. Then, these transferred charges are caused by the shift pulses $\Psi 1$ and $\Psi 2$ to successively produce in time-sequential relation. It is noted that during this time, the shift pulses $\phi 1$ and $\phi 2$ stop the second register RE by M bits.

Therefore, when the signal entering the control input terminal GSG assumes a high level, one of the transistors in each of the gate circuits G1 to GN is ON, causing the time-sequential signals from the first registers RE1 to REN to be transferred to and additively stored in the respective addresses of the second register.

On the other hand, when the control input GSG assumes a low level, only the other transistors of the gate circuits G1 to GN are turned on, causing the time-sequential signals from the first registers RE1 to REN to flow to the positive terminal of the battery.

It is to be understood from the foregoing that since the transfer of the time-sequential signals from the first registers RE1 to REN continues only for a time interval during which the signal at the control input terminal GSG is high, it is possible to control which charge in each of the first registers RE1 to REN is transferred, and of how long the transfer continues.

The lines labelled GSG-Ex.1, -Ex.2 and -Ex.3 represent three different examples of determination of such selection and duration.

In Example 1, the 5-bit time-sequential signal is all additively stored in the respective address in the second register RE, so that the amount of charge stored reaches a maximum, and when taken out as the time-sequential signal output from the second register, a large output signal level is also attained.

In Example 2, only the 3rd bit of the time-sequential signal is extracted and transferred to the second register RE, so that only the central portion of the area of an image formed with light coming from the object is sensed.

In Example 3, only the odd-numbered bits of the signal are extracted and transferred. This is advantageously used when a particular optical system is positioned in front of the line sensor, or when the object image is special.

According to an embodiment of the invention, a number of such different patterns for the signal GSG are readied and the selection of either one of the patterns is controlled so as to obtain an optimum output signal.

Figure 5:
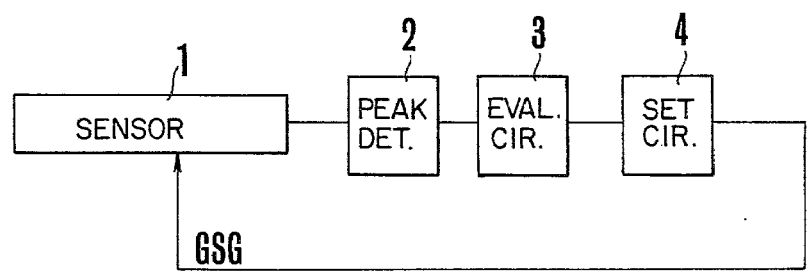
FIG. 5 is a block diagram showing an example of arrangement of the image sensor of the present invention for varying the video output in accordance with the object brightness.

Next, FIG. 5 is a block diagram showing an example of a circuit for changing the contribution rate of the picture element group of the solid state semi-conductor element to the output by changing over the contributing area control signal GSG in accordance with the object brightness. Here a sensor of 1 corresponds in construction to that shown in FIG. 3. A peak detection circuit 2 of known construction detects a maximum peak value of the output of the sensor 1. A 3 value evaluating circuit 3 serves for comparing the peak value detected by the peak detecting circuit 2 with, for example, a standard value to form a control signal dependent upon the brightness. A setting circuit 4 serves for the external control signal GSG to set the waveform of the GSG signal depending upon the output of the peak value evaluating circuit 3. When its output is applied to the sensor 1, the contributing area of the picture element output is changed in magnitude. Thus, the video output Vout from the sensor 1 is adjusted in accordance with the object brightness. It is noted that the setting circuit 4 may be simply such that the width of control signal GSG is increased depending upon the difference between the output of the peak detecting circuit 2 and the standard value.

Figure 6:
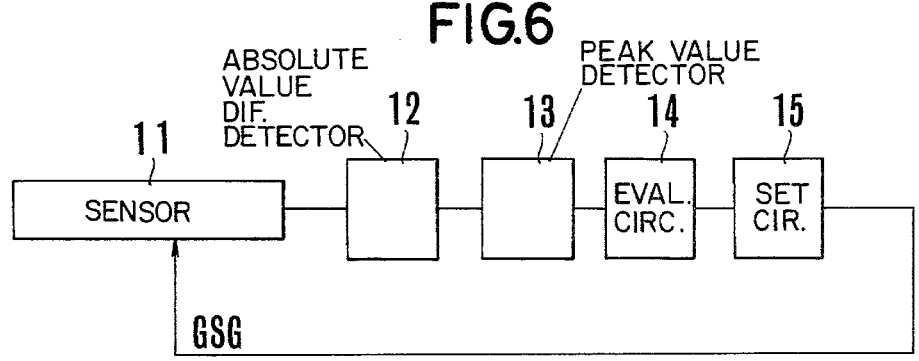
FIG. 6 is a block diagram showing another example of arrangement of the image sensor of the invention for varying the video output in accordance with the object contrast.

FIG. 6 is a block diagram of changing the magnitude of the contributing area of the picture element output of the solid state image pick-up element by the use of a control signal corresponding to the contrast of the object. The figure includes a sensor; 11 a circuit 12 for detecting the absolute value of difference between the picture element outputs as a quantity corresponding to the object contrast; and a circuit 13 for detecting a peak value of the difference in the output of the circuit 12. The output peak value of the circuit 13 is applied to a circuit 14 where in a similar manner to that shown in FIG. 5, a differential peak value is evaluated. The output of the circuit 14 is used in setting the waveform of the external control signal GSG by a circuit 15. Its output GSG signal controls the sensor 11, so the magnitude of the contributing area of the picture element output of the sensor 11 is varied in accordance with the object contrast.

As mentioned above, in the solid state image pick-up element of the present invention, the picture elements forming each row of the sensor are constructed with a plurality of divided picture elements, and these finely divided picture elements are arbitrarily selected to produce by the external control signal. This makes it possible to properly change each picture element output of the solid state image pick-up element. Therefore, when the external control signal is formed by the object brightness, contrast or other information, an optimum video output for the condition of the object can be obtained. This results in many advantages. For example, the sensitivity of the sensor can be increased without causing the lateral resolving power of the solid state image pick-up element to deteriorate.

What is claimed is:

1. A solid state semi-conductor element including:
    a plurality of line sensors,
        said line sensors each being arranged along a line and each sensor including a plurality of P-N junctions each of which accumulates a charge corresponding to the amount of light incident thereon;
    a plurality of first register means,
        said first register means corresponding one to one to said plurality of line sensors, each register means having a plurality of addresses, each address corresponding one to one with each P-N junction portion of the corresponding line sensor, the charge accumulated on each P-N junction portion being coupled for transfer to the respective address in each register means, and the charge signal transferred to the respective address of each register means being produced as a time-sequential signal from each register means by clock pulses;
    a second register means,
        said means having a plurality of addresses, each address being the same as the number of said first register means, each of the addresses of the second register means corresponding one to one to said first register means, the time-sequential output signals of the first register means being additively storable in the corresponding address of the second register means, and the signal stored in the second register means being able to be read out as a time-sequential signal; and
        gate means between each output of said first register means and each address input of the second register means for selectively transferring the signal from said first register means to said second register means.

2. A solid state semi-conductor element according to claim 1, wherein said plurality of line sensors are arranged in parallel in the same direction.

3. A solid state semi-conductor element according to claim 2, wherein the order of arrangement of said plurality of line sensors is the same as the order of arrangement of the corresponding addresses of the second register means.

4. A solid state semi-conductor element according to claim 1, wherein said gate means is controlled in accordance with the maximum value of the time-sequential signal output of said second register means.

5. A solid state semi-conductor element according to claim 1, wherein said gate means is controlled in accordance with the maximum value of the difference signal of the time-sequential signal output of said second register means.

6. A solid state semi-conductor device including:
    (a) a light receiving element having a plurality of photo-electric conversion portions distributed along two dimensions for converting individual picture element information of an image into an electrical signal;
    (b) register means having a plurality of storage locations, said storage locations each arranged to receive outputs of a plurality of photo-electric conversion portions located at different positions within said light receiving means, the outputs of the plurality of photo-electric conversion portions applied into each storage location being added together and accumulated; and
    (c) selection means for selectively applying only prescribed ones of the outputs of the corresponding photo-electric conversion portions into each storage portion.

7. A solid state semi-conductor device according to claim 6, wherein the plurality of photo-electric conversion portions form a matrix.

8. A solid state semi-conductor device according to claim 6, wherein said selection means is arranged to apply an equal number of outputs of the photo-electric conversion portions into each storage location.

9. A solid state semi-conductor device according to claim 6, wherein a plurality of shift means are each arranged to guide the outputs of each plurality of photo-electric conversion portions time sequentially into each storage location, the number of shift means being the same as that of the storage locations.

10. A solid state semi-conductor device according to claim 9, wherein each shift means can memorize the plurality of outputs of the photo-electric conversion portions distributed within the light receiving means at corresponding addresses within the shift means.

11. A solid state semi-conductor device according to claim 10, wherein each shift means is arranged to memorize the information of the plurality of photo-electric conversion portions and to produce an output therefrom in a time-sequential manner.

12. A solid state semi-conductor device according to claim 11, wherein said selection means are arranged to synchronize the output signals of each of said shift means to each other.

13. A solid state-semi-conductor element according to claim 12, wherein the selection means is arranged to block the input of the time-sequential signals from the shift means to the register means for a prescribed period of time.

* * * * *